US011851375B2

(12) United States Patent
Hirai et al.

(10) Patent No.: US 11,851,375 B2
(45) Date of Patent: Dec. 26, 2023

(54) CERAMIC COMPLEX AND METHOD FOR PRODUCING THE SAME

(71) Applicant: NICHIA CORPORATION, Anan (JP)

(72) Inventors: Toshiyuki Hirai, Komatsushima (JP); Keisuke Suzuki, Anan (JP); Hirofumi Oguri, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 224 days.

(21) Appl. No.: 17/304,956

(22) Filed: Jun. 29, 2021

(65) Prior Publication Data

US 2021/0403382 A1 Dec. 30, 2021

(30) Foreign Application Priority Data

Jun. 30, 2020 (JP) ................. 2020-113289

(51) Int. Cl.
*C04B 35/10* (2006.01)
*C04B 35/64* (2006.01)
*C04B 35/44* (2006.01)
*C09K 11/77* (2006.01)
*C04B 35/117* (2006.01)
*C04B 35/645* (2006.01)
*C04B 111/80* (2006.01)

(52) U.S. Cl.
CPC ............ *C04B 35/10* (2013.01); *C04B 35/117* (2013.01); *C04B 35/44* (2013.01); *C04B 35/64* (2013.01); *C04B 35/6455* (2013.01); *C09K 11/7774* (2013.01); *C04B 2111/807* (2013.01); *C04B 2235/3222* (2013.01); *C04B 2235/3224* (2013.01); *C04B 2235/3225* (2013.01); *C04B 2235/3227* (2013.01); *C04B 2235/661* (2013.01); *C04B 2235/662* (2013.01); *C04B 2235/77* (2013.01); *C04B 2235/78* (2013.01); *C04B 2235/786* (2013.01); *C04B 2235/963* (2013.01)

(58) Field of Classification Search
CPC ..... C09K 11/7774; C04B 35/44; C04B 35/10; C04B 35/64; C04B 35/6455; C04B 35/117; C04B 2111/807; C04B 2235/3217; C04B 2235/3222; C04B 2235/3224; C04B 2235/661; C04B 2235/3225; C04B 2235/77; C04B 2235/78; C04B 2235/786

See application file for complete search history.

(56) References Cited

U.S. PATENT DOCUMENTS

| | | | |
|---|---|---|---|
| 2014/0131753 | A1 | 5/2014 | Ishida et al. |
| 2015/0219291 | A1 | 8/2015 | Yamaguchi |
| 2015/0340577 | A1 | 11/2015 | Ishida et al. |
| 2017/0088774 | A1 | 3/2017 | Asai et al. |
| 2017/0186920 | A1 | 6/2017 | Kumano et al. |
| 2020/0181487 | A1* | 6/2020 | Kondo ............ C01F 17/34 |
| 2020/0264499 | A1 | 8/2020 | Arakawa |

FOREIGN PATENT DOCUMENTS

| | | |
|---|---|---|
| JP | 2014112635 A | 6/2014 |
| JP | 2015149394 A | 8/2015 |
| JP | 2017117912 A | 6/2017 |
| JP | 2020090424 A | 6/2020 |
| JP | 2020132847 A | 8/2020 |
| WO | 2015141711 A1 | 9/2015 |

* cited by examiner

*Primary Examiner* — C Melissa Koslow
(74) *Attorney, Agent, or Firm* — Hunton Andrews Kurth LLP

(57) ABSTRACT

A method for producing a ceramic complex includes: preparing a raw material mixture that contains 5% by mass or more and 40% by mass or less of first rare earth aluminate fluorescent material particles containing an activating element and a first rare earth element different from the activating element, 0.1% by mass or more and 32% by mass or less of oxide particles containing a second rare earth element, and the balance of aluminum oxide particles, relative to 100% by mass of the total amount of the first rare earth aluminate fluorescent material particles, the oxide particles, and the aluminum oxide particles; preparing a molded body of the raw material mixture; and obtaining a sintered body by calcining the molded body in a temperature range of 1,550° C. or higher and 1,800° C. or lower.

7 Claims, 9 Drawing Sheets

CERAMIC COMPLEX AND METHOD FOR PRODUCING THE SAME

CROSS-REFERENCE TO RELATED PATENT APPLICATION

This application claims priority to Japanese Patent Application No. 2020-113289, filed on Jun. 30, 2020, the disclosure of which is hereby incorporated by reference in its entirety.

BACKGROUND

Technical Field

The present disclosure relates to a ceramic complex and a method for producing the same.

Description of Related Art

There is known a light emitting device comprising a light emitting diode (LED) or a laser diode (LD) and a wavelength conversion member including a fluorescent material for converting the wavelength of light emitted from a light emitting element such as an LED or LD. Such a light emitting device is used for applications such as on-vehicle lighting, general-purpose lighting, backlight of liquid crystal display devices, and light sources for projectors. In this specification, the "fluorescent material" is used in the same meaning as a "fluorescent phosphor".

For example, Japanese Unexamined Patent Publication No. 2015-149394 discloses a ceramic complex including a Ce-activated yttrium aluminum garnet fluorescent material, an inorganic material composed of aluminum oxide existing between fluorescent material particles, and additive particles having a particle diameter smaller than that of the fluorescent material particles adhered to cover at least a part of the surface of the fluorescent material particles.

Ceramic complexes including a fluorescent material and a translucent inorganic material are required to have even higher luminance.

Thus, an aspect of the present disclosure has an object to provide a ceramic complex with high luminance and a method for producing the same.

SUMMARY

A first embodiment of the present disclosure is a method for producing a ceramic complex including: preparing a raw material mixture that contains first rare earth aluminate fluorescent material particles containing an activating element and a first rare earth element different from the activating element, oxide particles containing a second rare earth element, and aluminum oxide particles, wherein a content of the first rare earth aluminate fluorescent material particles is in a range of 5% by mass or more and 40% by mass or less, a content of the oxide particles containing the second rare earth element is in a range of 0.1% by mass or more and 32% by mass or less, and a content of the aluminum oxide particles is the balance, relative to 100% by mass of a total amount of the first rare earth aluminate fluorescent material particles, the oxide particles containing the second rare earth element, and the aluminum oxide particles; preparing a molded body by molding the raw material mixture; and obtaining a sintered body by calcining the molded body in a temperature range of 1,550° C. or higher and 1,800° C. or lower.

A second embodiment of the present disclosure is a ceramic complex including a first crystal phase that contains a first rare earth aluminate fluorescent material containing an activating element and a first rare earth element different from the activating element, a second crystal phase composed of a second rare earth aluminate containing a second rare earth element, wherein a content of an element capable of being an activator in the second crystal phase is 200 ppm by mass or less, and a third crystal phase composed of aluminum oxide, wherein a content of the first crystal phase is in a range of 5% by volume or more and 45% by volume or less, a content of the second crystal phase is in a range of 0.5% by volume or more and 50% by volume or less, and a content of the third crystal phase is the balance, relative to 100% by volume of a total amount of the first crystal phase, the second crystal phase, and the third crystal phase.

In accordance with the embodiments of the present disclosure, a ceramic complex with high luminance and a method for producing the same can be provided.

DETAILED DESCRIPTION

Figure 1A:
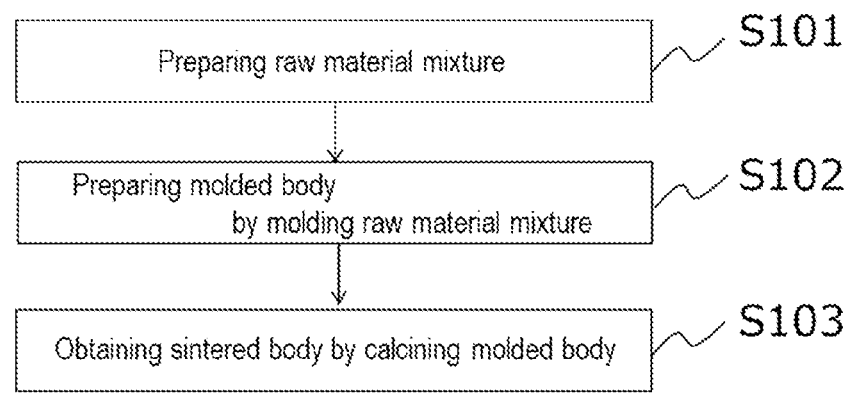
FIG. 1A is a flowchart describing a method for producing a ceramic complex according to the present disclosure.

The ceramic complex and the method for producing the same will be hereunder described on the basis of embodiments. The embodiments described below are exemplifications for embodying the technical idea of the present disclosure, and the present disclosure is not limited to the following ceramic complex and the method for producing the same. The relationships between color names and chromaticity coordinates, and the relationships between wavelength ranges of light and color names of monochromic light are in accordance with Japanese Industrial Standard (JIS) Z8110. In the present specification, ceramics refers to any inorganic non-metallic material at a temperature of 1,000° C. or lower.

Method for Producing Ceramic Complex

The method for producing a ceramic complex comprises: preparing a raw material mixture that contains first rare earth aluminate fluorescent material particles containing an activating element and a first rare earth element different from the activating element, oxide particles containing a second rare earth element, and aluminum oxide particles, wherein the content of the first rare earth aluminate fluorescent material particles is in a range of 5% by mass or more and 40% by mass or less, the content of the oxide particles is in a range of 0.1% by mass or more and 32% by mass or less, and the content of the aluminum oxide particles is the balance, relative to 100% by mass of the total amount of the first rare earth aluminate fluorescent material particles, the oxide particles, and the aluminum oxide particles; preparing a molded body by molding the raw material mixture; and obtaining a sintered body by calcining the prepared molded body in a temperature range of 1,550° C. or higher and 1,800° C. or lower.

It is presumed that the aluminum oxide in the molded body obtained by molding the raw material mixture undergoes particle growth by merging particles by the heat during calcining in the temperature range of 1,550° C. or higher and 1,800° C. or lower, and along with the particle growth, the oxide particles containing a second rare earth element gather around the aluminum oxide, and the oxide particles react with the aluminum oxide particles to form a second rare earth aluminate. When the second rare earth aluminate is formed around the first rare earth aluminate fluorescent material particles, the first rare earth aluminate fluorescent material and the second rare earth aluminate can be easily integrated without forming a grain boundary, thereby forming a first crystal phase containing the first rare earth aluminate fluorescent material. Since the first rare earth aluminate fluorescent material particles contained in the molded body and the second rare earth aluminate formed by reacting the oxide particles containing a second rare earth element with the aluminum oxide particles are integrated, the first crystal phase containing the first rare earth aluminate fluorescent material contained in the ceramic complex has a large first crystal diameter G1. When the first crystal diameter G1 of the first crystal phase containing the first rare earth aluminate fluorescent material becomes large, the first rare earth aluminate fluorescent material can easily absorb the light emitted from the excitation light source and emit light with high luminance. The first crystal phase containing the first rare earth aluminate fluorescent material contains an activating element, a first rare earth element different from the activating element, and a second rare earth element derived from the oxide particles. The first rare earth element and the second rare earth element may be the same element or different elements.

For example, the aforementioned Japanese Unexamined Patent Publication No. 2015-149394 discloses a ceramic complex in which additive particles substantially not containing an activator are attached to the surface of fluorescent material particles. In this ceramic complex, the fluorescent material particles and the additive particles are not integrated, and there is an interface between the fluorescent material particles and the additive particles.

On the other hand, in the first crystal phase contained in the ceramic complex according to the embodiment of the present disclosure, an interface is hardly formed between the first rare earth aluminate fluorescent material and the second rare earth aluminate. Therefore, the light emitted from the first rare earth aluminate fluorescent material in the ceramic complex is less affected by reflection due to the difference in refractive index near the interface, and the first crystal phase having a large first crystal diameter G1 increases the absorption efficiency of the light emitted from the excitation light source, allowing the ceramic complex to emit wavelength-converted light with high luminance. In the ceramic complex, the reason why there is no interface in the first crystal phase where the first rare earth aluminate fluorescent material and the second rare earth aluminate are integrated is presumed as follows. By calcination in the temperature range of 1,550° C. or higher and 1,800° C. or lower, the aluminum oxide reacts with the oxide particles while growing particles to form a second rare earth aluminate, and the second rare earth aluminate reacts with a first rare earth aluminate fluorescent material having a similar composition. Therefore, the interface is hardly formed between the first rare earth aluminate fluorescent material and the second rare earth aluminate, and the both are easily integrated and formed into one first crystal phase.

The resulting ceramic complex also contains a second crystal phase composed of a second rare earth aluminate formed by reacting the aluminum oxide particles which grow particles by the heat during calcining, with the oxide particles. This second rare earth aluminate is not integrated with the first rare earth aluminate fluorescent material. The resulting ceramic complex also contains a third crystal phase composed of aluminum oxide, which grows particles by the heat during calcining and does not react with the oxide particles. There is an interface between the first crystal phase in which the first rare earth aluminate fluorescent material and the second rare earth aluminate are integrated and the third crystal phase composed of aluminum oxide in the ceramic complex, since the crystal structure of each crystal phase is different. There is also an interface between the second crystal phase composed of the second rare earth aluminate and the third crystal phase composed of aluminum oxide, since the crystal structure of each crystal phase is different. When the second rare earth aluminate formed by reacting the oxide particles containing a second rare earth element with the aluminum oxide particles approaches the first rare earth aluminate fluorescent material, the second rare earth aluminate and the first rare earth aluminate fluorescent material are integrated, and thus the third crystal phase composed of aluminum oxide is present between the second crystal phase composed of the second rare earth aluminate and the first crystal phase containing the first rare earth aluminate fluorescent material. In the ceramic complex containing the first crystal phase containing the first rare earth aluminate fluorescent material, the second crystal phase composed of the second rare earth aluminate, and the third crystal phase composed of aluminum oxide, the light is scattered by the interface formed between each crystal phase, the light absorption efficiency of the first crystal phase containing the first rare earth aluminate fluorescent material integrated with the second rare earth aluminate is increased, and the wavelength of the light is efficiently converted, so that light with high luminance can be emitted.

Figure 1B:
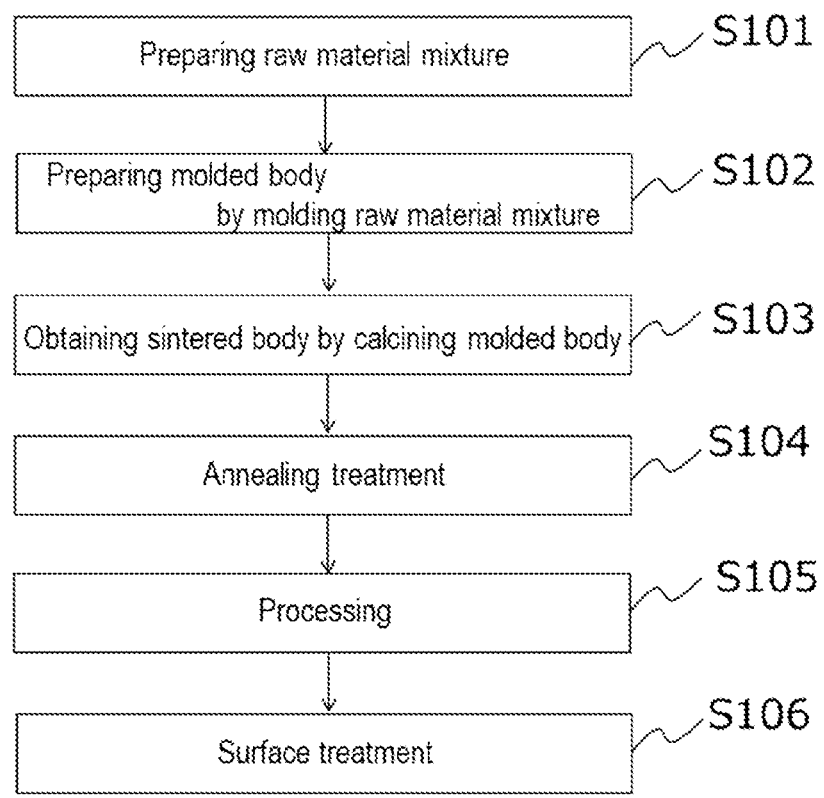
FIG. 1B is a flowchart describing a method for producing a ceramic complex according to the present disclosure.
Figure 2A:
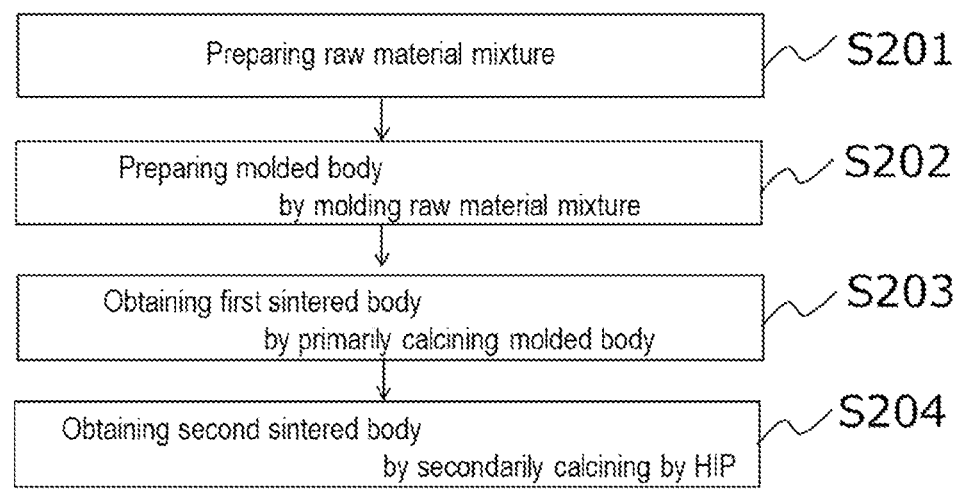
FIG. 2A is a flowchart describing a method for producing a ceramic complex according to the present disclosure.
Figure 2B:
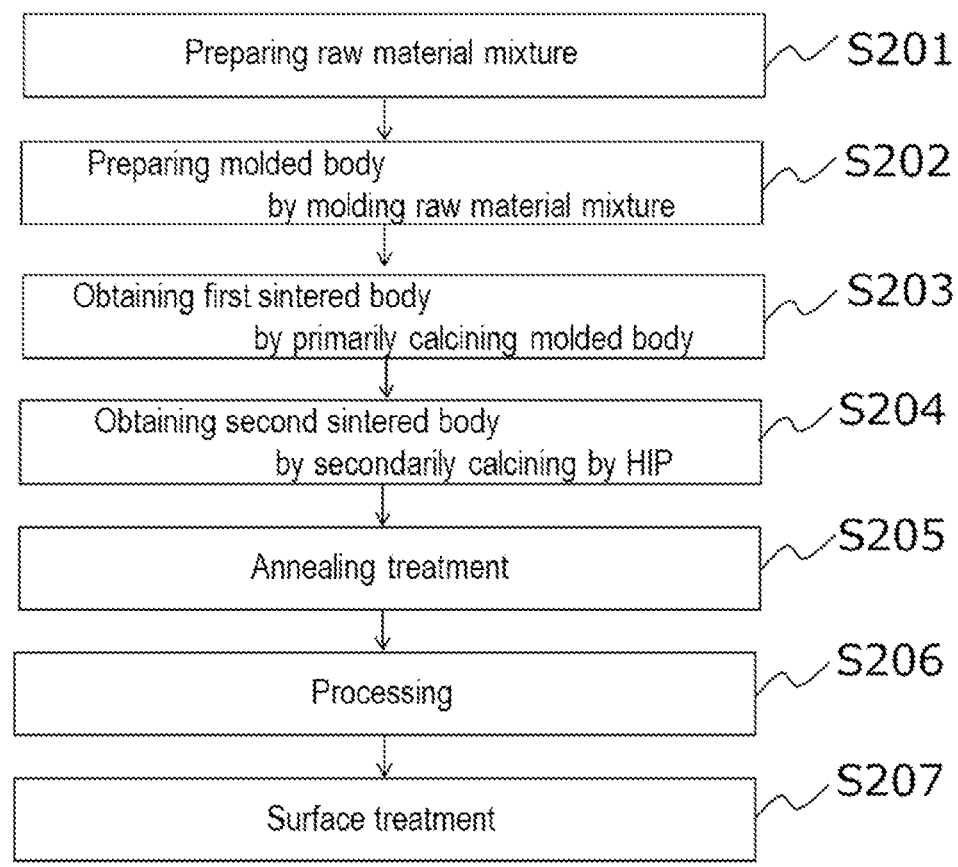
FIG. 2B is a flowchart describing a method for producing a ceramic complex according to the present disclosure.

FIGS. 1A and 1B, and FIGS. 2A and 2B are flowcharts showing examples of the method for producing a ceramic complex. Steps of the method for producing a ceramic complex will be described with reference to the drawings. As shown in FIG. 1A, the method for producing a ceramic complex includes a step S101 of preparing a raw material mixture containing first rare earth aluminate fluorescent material particles, oxide particles containing a second rare earth element, and aluminum oxide particles, a step S102 of preparing a molded body by molding the raw material mixture, and a step S103 of obtaining a sintered body by calcining the molded body in a temperature range of 1,550° C. or higher and 1,800° C. or lower. As shown in FIG. 2A, the method for producing a ceramic complex includes a step S201 of preparing a raw material mixture, and a step S202 of preparing a molded body by molding the raw material mixture; and may include a step S203 of obtaining a first sintered body by primarily calcining the molded body in a temperature range of 1,550° C. or higher and 1,800° C. or lower, and a step S204 of obtaining a second sintered body by secondarily calcining the first sintered body in a temperature range of 1,500° C. or higher and 1,800° C. or lower by hot isostatic pressing (HIP). As shown in FIG. 1B or FIG. 2B, the method for producing a ceramic complex may optionally include an annealing treatment step S104 or S205 after the step S103 of obtaining a sintered body, the step S203 of obtaining a first sintered body, or the step S204 of obtaining a second sintered body. Further, the method for producing a ceramic complex may optionally include a processing step S105 or S206 of cutting the obtained sintered body or the second sintered body into a desired size or thickness after the step S103 of obtaining a sintered body or the step S204 of obtaining a second sintered body, and may further optionally include a surface treatment step S106 or S207.

Step of Obtaining Raw Material Mixture
First Rare Earth Aluminate Fluorescent Material Particles The first rare earth aluminate fluorescent material particles preferably have a first rare earth aluminate composition that contains at least one first rare earth element $Ln^1$ selected from the group consisting of Y, Lu, Gd, and Tb, Ce serving as the activating element, and Al, and may optionally contain Ga, in which the total molar ratio of the first rare earth element $Ln^1$ and Ce is 3; the molar ratio of Ce is the product of a parameter a in a range of more than 0 and 0.22 or less, and 3; the total molar ratio of Al and Ga is in a range of 4.5 or more and 5.5 or less; the molar ratio of Al is the product of a parameter c in a range of more than 0 and 1.1 or less, and 5; and the molar ratio of Ga that may be optionally contained is the product of a parameter b in a range of 0 or more and 0.4 or less, and 5.

In the step of preparing a raw material mixture, the first rare earth aluminate fluorescent material particles preferably have a composition represented by the following formula (I);

$$(Ln^1_{1-a}Ce_a)_3(Al_cGa_b)_5O_{12} \quad (I)$$

wherein $Ln^1$ represents at least one element selected from the group consisting of Y, Gd, Lu, and Tb; and the parameters a, b, and c each satisfy $0<a\leq0.22$, $0\leq b\leq0.4$, $0<c\leq1.1$, and $0.9\leq b+c\leq1.1$.

The first rare earth element $Ln^1$ contained in the first rare earth aluminate fluorescent material particles may include two or more elements selected from the group consisting of Y, Lu, Gd, and Tb. The first rare earth element $Ln^1$ may include at least one selected from the group consisting of Y, Lu, and Gd. The first rare earth element $Ln^1$ may include Y and Gd, or may include Y and Lu. When two or more first rare earth elements $Ln^1$ are contained in the first rare earth aluminate fluorescent material and the first rare earth elements $Ln^1$ are Y and Gd, the molar ratio of Y and Gd (Y:Gd) is preferably in a range of 99.5:0.5 to 70:30, and may be in a range of 99:1 to 80:20, or may be in a range of 99:1 to 90:10 in the composition of the first rare earth aluminate fluorescent material.

In the composition of the first rare earth aluminate fluorescent material particles, the molar ratio of Ce is represented by the product of 3 and the parameter a. In the composition of the first rare earth aluminate fluorescent material particles, the molar ratio of Ce is preferably in a range of more than 0 and 0.66 or less, and may be in a range of 0.001 or more and 0.60 or less, may be in a range of 0.003 or more and 0.450 or less, may be in a range of 0.006 or more and 0.300 or less, may be in a range of 0.012 or more and 0.270 or less, or may be in a range of 0.015 or more and 0.240 or less. In the composition of the first rare earth aluminate fluorescent material particles, the parameter a is in a range of more than 0 and 0.22 or less (0<a≤0.22), and may be in a range of 0.0003 or more and 0.20 or less (0.0003≤a≤0.20), may be in a range of 0.001 or more and 0.150 or less (0.001≤a≤0.150), may be in a range of 0.002 or more and 0.100 or less (0.002≤a≤0.100), may be in a range of 0.004 or more and 0.090 or less (0.004≤a≤0.090), or may be in a range of 0.005 or more and 0.080 or less (0.005≤a≤0.080).

In the composition of the first rare earth aluminate fluorescent material particles, the molar ratio of Al is represented by the product of 5 and the parameter c. In the composition of the first rare earth aluminate fluorescent material particles, the molar ratio of Al is in a range of more than 0 and 5.5 or less, and may be in a range of 0.54 or more and 5.0 or less, or may be in a range of 0.63 or more and 5.0 or less. In the composition of the first rare earth aluminate fluorescent material particles, the parameter c is in a range of more than 0 and 1.1 or less, and may be in a range of 0.6 or more and 1.0 or less (0.6≤c≤1.0), or may be in a range of 0.7 or more and 1.0 or less (0.7≤c≤1.0).

In the composition of the first rare earth aluminate fluorescent material particles, Ga may not be contained. In the composition of the first rare earth aluminate fluorescent material particles, the molar ratio of Ga is represented by the product of 5 and the parameter b. In the composition of the first rare earth aluminate fluorescent material particles, the molar ratio of Ga is in a range of 0 or more and 2.0 or less, and may be in a range of 0.1 or more and 1.5 or less, or may be in a range of 0.2 or more and 1.2 or less. In the composition of the first rare earth aluminate fluorescent material particles, the parameter b is in a range of 0 or more and 0.4 or less (0≤b≤0.4), and may be in a range of 0.02 or more and 0.3 or less (0.02≤b≤0.3), or may be in a range of 0.04 or more and 0.24 or less (0.04≤b≤0.24).

In the composition of the first rare earth aluminate fluorescent material particles, the total molar ratio of Al and Ga is in a range of 4.5 or more and 5.5 or less, and may be 5. In the composition of the first rare earth aluminate fluorescent material particles, the sum of the parameter b and the parameter c is in a range of 0.9 or more and 1.1 or less (0.9≤b+c≤1.1), and may be 1 (b+c=1).

The first rare earth aluminate fluorescent material particles preferably have a first average particle diameter D1, as measured according to a Fisher Sub-Sieve Sizer (hereinafter, also referred to as "FSSS") method, in a range of 4 μm or more and 40 μm or less, more preferably in a range of 5 μm or more and 35 μm or less, and even more preferably in a range of 8 μm or more and 30 μm or less. The FSSS method is a type of an air permeability method, and is a method for measuring a specific surface area by utilizing the flow resistance of air so as to mainly determine an average particle diameter of primary particles. The average particle diameter measured according to the FSSS method is a Fisher Sub-Sieve Sizer's number. When the first average particle diameter D1 of the first rare earth aluminate fluorescent material particles, as measured according to the FSSS method, falls within the range of 4 μm or more and 40 μm or less, the first crystal diameter G1 of the first crystal phase containing the first rare earth aluminate fluorescent material integrated with the second rare earth aluminate becomes larger in the resulting ceramic complex. In the resulting ceramic complex, the first crystal phase having a larger first crystal diameter G1 can efficiently absorb the light emitted from the excitation light source to convert the wavelength, thereby emitting light with high luminance. Further, when the first average particle diameter D1 of the first rare earth aluminate fluorescent material particles falls within the range of 4 μm or more and 40 μm or less, the formation of voids is suppressed, and a ceramic complex having a high relative density can be obtained together with the oxide particles containing a second rare earth element and the aluminum oxide particles.

Oxide Particles Containing Second Rare Earth Element

The oxide particles containing a second rare earth element may be simply referred to as "oxide particles". The second rare earth element contained in the oxide particles is preferably an element different from the activating element contained in the first rare earth aluminate fluorescent material. Examples of the second rare earth element contained in the oxide particles include at least one selected from the group consisting of Sc, Y, La, Pr, Nd, Pm, Sm, Eu, Gd, Tb, Dy, Ho, Er, Tm, Yb, and Lu. The second rare earth element contained in the oxide particles is preferably at least one selected from the group consisting of Y, La, Nd, Pm, Gd, Tb, Dy, Ho, Er, Yb, and Lu, and more preferably at least one selected from the group consisting of Y, La, Nd, Gd, Tb, Yb, and Lu. It is further preferred that the oxide particles contain at least one second rare earth element $Ln^2$ selected from the group consisting of Y, Gd, Tb, and Lu. The oxide particles may be two or more types of oxide particles containing one type of the second rare earth element and different second rare earth elements. Specifically, the oxide particles are preferably particles composed of at least one oxide selected from the group consisting of $Y_2O_3$, $La_2O_3$, $Pr_7O_{11}$, $Nd_2O_3$, $Gd_2O_3$, $Tb_4O_7$, $Yb_2O_3$, and $Lu_2O_3$. It is more preferred that the oxide particles are at least one type of oxide particles selected from the group consisting of $Y_2O_3$, $La_2O_3$, $Nd_2O_3$, $Gd_2O_3$, $Tb_4O_7$, $Yb_2O_3$, and $Lu_2O_3$, and even more preferred that the oxide particles are at least one type of oxide particles selected from the group consisting of $Y_2O_3$, $Gd_2O_3$, $Tb_4O_7$, and $Lu_2O_3$. One type of oxide particles may be used alone, or two or more types thereof may be used in combination. The oxide particles refer to particles composed of oxides containing a second rare earth element. The oxide particles may not contain aluminum. The oxide particles without containing aluminum refer to oxide particles having an aluminum content of less than 1% by mass.

The oxide particles preferably have a second average particle diameter D2, as measured according to the FSSS method, in a range of 0.05 μm or more and less than 5 μm, and more preferably in a range of 0.1 μm or more and 4 μm or less. When the second average particle diameter D2 of the oxide particles falls within the range of 0.05 μm or more and less than 5 μm, in calcining a molded body to be described later in a range of 1,550° C. or higher and 1,800° C. or lower, the oxide particles easily gather around the aluminum oxide that grows particles by the heat during calcining, and the oxide particles containing a second rare earth element react with the oxide aluminum to easily form a second rare earth aluminate. The formed second rare earth aluminate can be integrated with the first rare earth aluminate fluorescent material to increase the first crystal diameter G1 of the first crystal phase containing the first rare earth aluminate fluorescent material, and the light emitted from the excitation light source can be easily wavelength-converted, thereby producing a ceramic complex capable of emitting light with high luminance.

Aluminum Oxide Particles

The aluminum oxide particles preferably have an aluminum oxide purity of 99.0% by mass or more, and more preferably 99.5% by mass or more. When the aluminum oxide purity in the aluminum oxide particles is 90.0% by mass or more, impurities can be reduced, and a ceramic complex capable of emitting light with high luminance can be produced. The aluminum oxide purity in the aluminum oxide particles can be referred to the value of aluminum oxide purity listed in the catalog. In the case where the aluminum oxide purity in the aluminum oxide particles is unknown, the purity of the aluminum oxide particles can be measured in such a manner that the mass of the aluminum oxide particles is measured, the aluminum oxide particles are then calcined at 800° C. for 1 hour in an air atmosphere to eliminate organic materials or moisture attached to or adsorbed on the aluminum oxide particles, the mass of the aluminum oxide particles after calcination is measured, and the mass of the aluminum oxide particles after calcination is divided by the mass of the aluminum oxide particles before calcination.

The aluminum oxide particles preferably have a third average particle diameter D3, as measured according to the FSSS method, in a range of 0.1 μm or more and 1.5 μm or less, and more preferably in a range of 0.2 μm or more and 1.0 μm or less. When the third average particle diameter D3 of the aluminum oxide particles falls within the range of 0.1 μm or more and 1.5 μm or less, in calcining a molded body to be described later in a range of 1,550° C. or higher and 1,800° C. or lower, the aluminum oxide particles easily grow by the heat during calcining to form a second rare earth aluminate together with the oxide particles, the relative density is increased, and the light emitted from the excitation light source can be easily wavelength-converted, thereby producing a ceramic complex capable of emitting light with high luminance.

Raw Material Mixture

In the raw material mixture, the content of the first rare earth aluminate fluorescent material particles is in a range of 5% by mass or more and 40% by mass or less, the content of the oxide particles is in a range of 0.1% by mass or more and 32% by mass or less, and the content of the aluminum oxide particles is the balance, relative to 100% by mass of the total amount of the first rare earth aluminate fluorescent material particles, the oxide particles, and the aluminum oxide particles. When the content of the first rare earth aluminate fluorescent material particles falls within the range of 5% by mass or more and 40% by mass or less relative to 100% by mass of the total amount of the first rare earth aluminate fluorescent material particles, the oxide particles, and the aluminum oxide particles in the raw material mixture, it is preferred that the content of the oxide particles is in a range of 0.5% by mass or more and 30% by mass or less and the content of the aluminum oxide particles is the balance; it is more preferred that the content of the oxide particles is in a range of 1.0% by mass or more and 28% by mass or less and the content of the aluminum oxide particles is the balance; it is further preferred that the content of the oxide particles is in a range of 3.0% by mass or more and 25% by mass or less and the content of the aluminum oxide particles is the balance; and it is particularly preferred that the content of the oxide particles is in a range of 5.0% by mass or more and 20% by mass or less and the content of the aluminum oxide particles is the balance. When the content of each of the first rare earth aluminate fluorescent material particles, the oxide particles, and the aluminum oxide particles in the raw material mixture falls within the above-mentioned range, the oxide particles and the aluminum oxide particles are reacted each other to form a second rare earth aluminate by calcination in the temperature range of 1,550° C. or more and 1,800° C. as described later, and the second rare earth aluminate can be integrated with the first rare earth aluminate fluorescent material to produce a ceramic complex containing a first crystal phase having a large first crystal diameter G1. Further, when the content of each of the first rare earth aluminate fluorescent material particles, the oxide particles, and the aluminum oxide particles in the raw material mixture falls within the above-mentioned range, a ceramic complex containing a third crystal phase composed of aluminum oxide in which the aluminum oxide particles grow and a second crystal phase composed of a second rare earth aluminate which is not integrated with the first rare earth aluminate fluorescent material by reacting the aluminum oxide particles with the oxide particles, can be produced.

The first rare earth aluminate fluorescent material particles, the oxide particles, and the aluminum oxide particles can be mixed in a wet or dry manner using a mixer to obtain a raw material mixture. As the mixer, a ball mill, a vibration mill, a roll mill, a jet mill, or the like, which are industrially commonly used, can be used.

Step of Preparing Molded Body

In the step of preparing a molded body, the raw material mixture is molded to prepare a molded body. As the method for forming the molded body, a known method such as a press molding method can be adopted. Examples of the press molding method include a die press molding method and a cold isostatic pressing (CIP) method for which the term is defined in No. 2109 of JIS Z2500:2000. Alternatively, the raw material mixture may be uniaxially compressed and molded to obtain a molded body. As the method for molding the raw material mixture to obtain a molded body, two kinds of methods may be adopted to shape the molded body, for example, CIP may be performed after die press molding, or CIP may be performed after uniaxial compression by a roller bench method. For CIP, it is preferable to press the molded body by a cold isostatic pressing method using water as a medium.

The pressure during die press molding or when molding by uniaxial compression is preferably in a range of 5 MPa or more and 50 MPa or less, and more preferably in a range of 5 MPa or more and 30 MPa or less. When the pressure during die press molding or when molding by uniaxial compression falls within the above-mentioned range, the molded body can be shaped to a desired shape.

The pressure in CIP is preferably in a range of 50 MPa or more and 200 MPa or less, and more preferably in a range of 50 MPa or more and 180 MPa or less. When the pressure in CIP falls within the range of 50 MPa or more and 200 MPa or less, it is possible to form a molded body capable of obtaining a ceramic complex having a relative density of 95% or more by calcining at 1,550° C. or higher and 1,800° C. or lower, as described later.

Step of Obtaining Sintered Body by Calcining (Primary Calcining Step)

In the step of obtaining a sintered body, the molded body is calcined in a temperature range of 1,550° C. or higher and 1,800° C. or lower to obtain a sintered body. The molded body may be primarily calcined in a temperature range of 1,550° C. or higher and 1,800° C. or lower to obtain a first sintered body. The calcining temperature is preferably in a range of 1,600° C. or higher and 1,750° C. or lower, and more preferably in a temperature range of 1,650° C. or higher and 1,700° C. or lower. When the calcining temperature of the molded body falls within the range of 1,550° C. or higher and 1,800° C. or lower, the reaction between the aluminum oxide particles and the oxide particles can be promoted without dissolving the first rare earth aluminate fluorescent material to produce a ceramic complex containing a first crystal phase with a large crystal diameter containing the first rare earth aluminate fluorescent material integrated with the second rare earth aluminate, a second crystal phase composed of the second rare earth aluminate, and a third crystal phase composed of the aluminum oxide.

Secondary Calcining Step

The secondary calcining step is a step of obtaining a second sintered body by secondarily calcining the first sintered body in a temperature range of 1,500° C. or higher and 1,800° C. or lower by hot isostatic pressing (HIP). The method for producing a ceramic complex may include the secondary calcining step.

In the secondary calcining step, the secondary calcining is preferably performed in a temperature range of 1,500° C. or higher and 1,800° C. or lower by hot isostatic pressing (HIP) for which the term is defined in No. 2112 of JIS Z2500:2000. By performing the secondary calcining step, a ceramic complex with higher relative density can be obtained. The secondary calcining temperature is more preferably in a range of 1,550° C. or higher and 1,800° C. or lower, even more preferably in a temperature range of 1,600° C. or higher and 1,750° C. or lower, and particularly preferably in a temperature range of 1,650° C. or higher and 1,700° C. or lower. The secondary calcining can be performed in an argon or nitrogen atmosphere.

In the secondary calcining, the pressure in HIP is preferably in a range of 50 MPa or more and 300 MPa or less, and more preferably in a range of 80 MPa or more and 200 MPa or less. When the pressure in HIP falls within the range of 50 MPa or more and 300 MPa or less, the entire second sintered body can be made uniform and of higher density without damaging the crystal structure of the first crystal phase containing the first rare earth aluminate fluorescent material.

The time of the secondary calcining performed by HIP is, for example, in a range of 0.5 hour or more and 20 hours or less, and preferably in a range of 1 hour or more and 10 hours or less in order to uniformly increase the density of the entire second sintered body.

Annealing Treatment

The obtained sintered body, the first sintered body, or the second sintered body may be subjected to an annealing treatment in a reducing atmosphere. By annealing the obtained sintered body in a reducing atmosphere, the oxidized activating element contained in the first crystal phase containing the first rare earth aluminate fluorescent material can be reduced, and the decrease in wavelength conversion efficiency and luminance due to oxidation of the activating element that is the center of light emission can be suppressed. The reducing atmosphere may be an atmosphere containing at least one rare gas selected from the group consisting of helium, neon, and argon, or a nitrogen gas, and a hydrogen gas or a carbon monoxide gas, and it is preferred that at least argon or a nitrogen gas, and a hydrogen gas or a carbon monoxide gas are contained in the atmosphere. The annealing treatment may be performed on the sintered body or the first sintered body, may be performed on the second sintered body, or may be performed on either the first sintered body or the second sintered body.

The annealing treatment temperature is a temperature lower than the calcining temperature, and is preferably in a range of 1,000° C. or higher and 1,500° C. or lower. The annealing treatment temperature is more preferably in a range of 1,000° C. or higher and 1,400° C. or lower, and even more preferably in a range of 1,100° C. or higher and 1,350° C. or lower. When the annealing treatment temperature is a temperature lower than the calcining temperature, primary calcining temperature, or secondary calcining temperature, and falls within the range of 1,000° C. or higher and 1,500° C. or lower, the oxidized activating element contained in the first crystal phase containing the first rare earth aluminate fluorescent material in the ceramic complex can be reduced, and the decrease in wavelength conversion efficiency and luminance can be suppressed.

Processing Step

The obtained sintered body may be processed to be cut into a desired size or thickness. A known cutting method can be used, and examples thereof include a cutting method using at least one method selected from blade dicing, laser dicing, and wire sawing. Of these, wire sawing is preferred since the unevenness of the cut surface can be further reduced.

Surface Treatment Step

Further, a surface treatment step described below may be added. The surface treatment step is a step of surface-treating the surface of the cut product obtained by cutting the obtained sintered body or the second sintered body. The surface treatment step not only allows the surface of the ceramic complex to be in an appropriate state in order to improve the light emitting characteristics of the ceramic complex, but also allows the ceramic complex to be formed into a desired shape, size, or thickness in combination with the above-mentioned processing step or alone. The surface treatment step may be performed before the processing step in which the sintered body or the second sintered body is cut into a desired size or thickness, or may be performed after the processing step. Examples of the surface treatment method include at least one method selected from a sandblasting method, a mechanical grinding method, a dicing method, and a chemical etching method.

The resulting ceramic complex preferably contains a second crystal phase composed of a second rare earth aluminate, wherein a content of an element capable of being an activator in the second crystal phase is 200 ppm by mass or less. The oxide particles contained in the raw material mixture react with the aluminum oxide to form a second rare earth aluminate, and the formed second rare earth aluminate is integrated with the first rare earth aluminate fluorescent material to form a first crystal phase. Also, the oxide particles contained in the raw material mixture react with the aluminum oxide to form a second rare earth aluminate, and the formed second rare earth aluminate is not integrated with the first rare earth aluminate fluorescent material to form a second crystal phase composed of the second rare earth aluminate. The second crystal phase composed of the second rare earth aluminate in the ceramic complex is a second crystal phase formed by reacting the oxide particles containing a second rare earth element with aluminum oxide along with the particle growth of the aluminum oxide by calcination in the temperature range of 1,550° C. or more and 1,800° C. or less. Thus, the second crystal phase does not substantially contain an element that can be an activator, and the content of the element that can be an activator is 200 ppm by mass or less. When the activating element of the first rare earth aluminate fluorescent material is cerium (Ce), the content of cerium (Ce) in the second crystal phase composed of the second rare earth aluminate is 200 ppm by mass or less. The content of an element that can be an activator contained in the second crystal phase composed of the second rare earth aluminate can be determined by measuring the content of an element that can be an activator, for example cerium, at the cross section of the second crystal phase composed of the second rare earth aluminate in the ceramic complex by energy dispersive X-ray spectrometry (EDX). The content of an element that can be an activator contained in the second crystal phase composed of the second rare earth aluminate in the ceramic complex is 200 ppm by mass or less, and may be 150 ppm by mass or less, may be 100 ppm by mass or less, may be the measurement limit by EDX or less, may be at 0 ppm by mass, may be 0.1 ppm by mass or more, or may be 1 ppm by mass or more.

The second rare earth aluminate preferably has a composition represented by the following formula (II). The second rare earth aluminate is formed by reacting the aluminum oxide particles with the oxide particles containing a second rare earth element by calcination in the temperature range of 1,550° C. or higher and 1,800° C. or lower, and when the second rare earth element $Ln^2$ contained in the oxide particles is at least one selected from the group consisting of Y, Gd, Tb, and Lu, the second rare earth element having a composition represented by the following formula (II) is formed:

$$Ln^2_3Al_5O_{12} \qquad (II)$$

wherein $Ln^2$ represents at least one element selected from the group consisting of Y, Gd, Tb, and Lu.

Ceramic Complex

The ceramic complex comprises a first crystal phase that contains a first rare earth aluminate fluorescent material containing an activating element and a first rare earth element different from the activating element, a second crystal phase composed of a second rare earth aluminate containing a second rare earth element, wherein a content of an element capable of being an activator in the second crystal phase is 200 ppm by mass or less, and a third crystal phase composed of aluminum oxide, wherein the content of the first crystal phase is in a range of 5% by volume or more and 45% by volume or less, the content of the second crystal phase is in a range of 0.5% by volume or more and 50% by volume or less, and the content of the third crystal phase is the balance, relative to 100% by volume of the total amount of the first crystal phase, the second crystal phase, and the third crystal phase. The ceramic complex is preferably produced by the above-mentioned production method. In the ceramic complex, the light emitted from the excitation light source can be wavelength-converted by the first crystal phase containing the first rare earth aluminate fluorescent material integrated with the second rare earth aluminate contained in the range of 5% by volume or more and 45% by volume or less, allowing the ceramic complex to emit light with high luminance. Further, the ceramic complex contains the second crystal phase composed of the second rare earth aluminate in the range of 0.5% by volume or more and 50% by volume or less, and the third crystal phase composed of aluminum oxide which is the balance obtained by excluding the first crystal phase and the second crystal phase from 100% by volume of the first crystal phase, the second crystal phase, and the third crystal phase. Thus, the light is scattered at the interface between the second crystal phase and the third crystal phase to increase the light absorption efficiency of the first crystal phase containing the first rare earth aluminate fluorescent material integrated with the second rare earth aluminate, and the wavelength can be efficiently converted, allowing the ceramic complex to emit light with increased luminance. The content of the first crystal phase in the ceramic complex may be in a range of 10% by volume or more and 40% by volume or less, or may be in a range of 12% by volume or more and 35% by volume or less. The content of the second crystal phase in the ceramic complex may be in a range of 1% by volume or more and 45% by volume or less, may be in a range of 3% by volume or more and 40% by volume or less, or may be in a range of 5% by volume or more and 35% by volume or less.

The content (% by volume) of the first crystal phase and the content (% by volume) of the second crystal phase in the ceramic complex can be determined by: photographing scanning electron microscope (SEM) images of several arbitrary cross sections of the ceramic complex using an SEM; determining volume ratios of the first crystal phase and the second crystal phase from the SEM images; and calculating the average value from the volume ratios of the first crystal phase and the second crystal phase in the several arbitrary cross sections.

The content (% by volume) of the first crystal phase and the content (% by volume) of the second crystal phase in the ceramic complex can be calculated from: the content of mass ratio and true density of the first rare earth aluminate fluorescent material particles; the content of mass ratio and true density of the oxide particles containing the second rare earth element; and the true density of the aluminum oxide particles in the raw material mixture forming the ceramic complex.

Content (% by Volume) of First Crystal Phase

The content of the first crystal phase in the ceramic complex can be calculated based on the following formula (1):

$$\text{First crystal phase}(\% \text{ by volume}) = \frac{(P1_m \div P1_d)}{(P1_m \div P1_d) + \{(100 - P1_m) \div P3_d\}} \times 100 \quad (1)$$

Mass ratio (% by mass) of first crystal phase (first rare earth aluminate fluorescent material particles): $P1_m$ True density (g/cm³) of first crystal phase (first rare earth aluminate fluorescent material particles): $P1_d$ True density (g/cm³) of third crystal phase (aluminum oxide particles): $P3_d$ Content (% by Volume) of Second Crystal Phase The content of the second crystal phase in the ceramic complex can be calculated based on the following formula (2):

$$\text{Second crystal phase}(\% \text{ by volume}) = \frac{(P2_m \div P2_d)}{(P2_m \div P2_d) + \{(100 - P2_m) \div P3_d\}} \times 100 \quad (2)$$

Mass ratio (% by mass) of second crystal phase (second rare earth aluminate): $P2_m$ True density (g/cm³) of second crystal phase (second rare earth aluminate): $P2_d$ True density (g/cm³) of third crystal phase (aluminum oxide particles): $P3_d$ The content (% by mass) of the mass ratio of the second crystal phase in the ceramic complex can be calculated from the content (% by mass) of the mass ratio and true density of the oxide particles containing the second rare earth element in the raw material mixture, based on the following formulae (3) and (4):

Second crystal phase(% by volume) Oxide containing second rare earth element = in raw material mixture(% by mass) × K  (3)

$K$ = (Molecular weight of oxide containing second rare earth element ÷ Molar number of second rare earth element) × (Molecular weight of second rare earth aluminate ÷ Molar number of second rare earth element)  (4)

First Crystal Diameter G1 of First Crystal Phase and Second Crystal Diameter G2 of Second Crystal Phase The first crystal phase and the second crystal phase contained in the ceramic complex preferably have a first crystal diameter G1 of the first crystal phase in a range of 5 μm or more and 40 μm or less, and a second crystal diameter G2 of the second crystal phase in a range of 0.5 μm or more and less than 5 μm, as measured under the following measurement conditions.

Measurement Conditions:

in a scanning electron microscope (SEM) image obtained by photographing the cross section of the ceramic complex using an SEM, the maximum width in the cross section of the first crystal phase or the second crystal phase, and the minimum width passing through the center point of the maximum width are measured; the average of the maximum width and the minimum width is defined as the diameter for each of the first crystal phase and the second crystal phase; and the average value of the diameters of 20 first crystal phases or second crystal phases randomly selected is regarded as the first crystal diameter G1 of the first crystal phase or the second crystal diameter G2 of the second crystal phase.

When the first crystal diameter G1 of the first crystal phase contained in the ceramic complex falls within the range of 5 μm or more and 40 μm or less, the first crystal phase containing the first rare earth aluminate fluorescent material integrated with the second rare earth aluminate absorbs the light emitted from the excitation light source and converts the wavelength, allowing the ceramic complex to emit light with high luminance. The first crystal diameter G1 of the first crystal phase may be in a range of 8 μm or more and 35 μm or less, or may be in a range of 10 μm or more and 30 μm or less.

When the second crystal diameter G2 of the second crystal phase contained in the ceramic complex falls within the range of 0.5 μm or more and 5 μm or less, the light emitted from the excitation light source can be scattered at the interface between the second crystal phase composed of the second rare earth aluminate and the third crystal phase composed of aluminum oxide to enhance the light absorption efficiency of the first crystal phase and efficiently convert the wavelength, allowing the ceramic complex to emit light with high luminance. The second crystal diameter G2 of the second crystal phase may be in a range of 0.6 μm or more and 4 μm or less, or may be in a range of 0.7 μm or more and 3 μm or less.

Ratio G2/G1

The ratio G2/G1 of the second crystal diameter G2 to the first crystal diameter G1 is preferably 0.4 or less, and may be 0.3 or less, may be 0.2 or less, or may be 0.01 or more. When the ratio G2/G1 of the second crystal diameter G2 of the second crystal phase composed of the second rare earth aluminate to the first crystal diameter G1 of the first crystal phase containing the first rare earth aluminate fluorescent material integrated with the second rare earth aluminate is 0.4 or less, the first crystal phase becomes large compared to the second crystal phase, the absorption efficiency of the light emitted from the excitation light source is improved, and the light emitted from the excitation light source is efficiently absorbed and wavelength-converted, allowing the ceramic complex to emit light with higher luminance. Further, when the ratio G2/G1 is 0.4 or less, the second crystal phase composed of the second rare earth aluminate becomes small compared to the first crystal phase, the scattering of the light emitted from the excitation light source at the interface between the second crystal phase and the third crystal phase is increased, and the light absorption efficiency of the first crystal phase can be enhanced, allowing the ceramic complex to emit light with higher luminance. The ratio G2/G1 may be 0.3 or less, may be 0.2 or less, may be 0.01 or more, or may be 0.02 or more.

Relative Density

The ceramic complex preferably has a relative density of 95% or more. When the relative density of the ceramic complex is 95% or more, the scattering of the light emitted from the excitation light source at the interface between the second crystal phase and the third crystal phase in the ceramic complex is increased, and the light emitted from the excitation light source is efficiently absorbed in the first crystal phase and wavelength-converted, allowing the ceramic complex to emit light with higher luminance. The relative density of the ceramic complex may be 97% or more, or may be 98% or more.

The relative density of the ceramic complex can be calculated from the apparent density of the ceramic complex and the true density of the ceramic complex by the following formula (5):

$$\text{Relative density (\%) of ceramic complex} = (\text{Apparent density of ceramic complex} \div \text{True density of ceramic complex}) \times 100 \quad (5)$$

The apparent density of the ceramic complex is a value obtained by dividing the mass of the ceramic complex by the volume of the ceramic complex, and can be calculated by the following formula (6):

$$\text{Apparent density}(g/cm^3) \text{ of ceramic complex} = \text{Mass (g) of ceramic complex} \div \text{Volume}(cm^3) \text{ of ceramic complex (Archimedes' method)} \quad (6)$$

The true density of the ceramic complex can be calculated by the following formula (7):

$$\text{True density}(g/cm^3) \text{ of ceramic complex} = \frac{P1_m + P2_m + P3_m}{(P1_m \div P1_d) + (P2_m \div P2_d) + (P3_m \div P3_d)} \quad (7)$$

Mass ratio (% by mass) of first crystal phase (first rare earth aluminate fluorescent material particles): $P1_m$ True density (g/cm$^3$) of first crystal phase (first rare earth aluminate fluorescent material particles): $P1_d$ Mass ratio (% by mass) of second crystal phase (second rare earth aluminate): $P2_m$ True density (g/cm$^3$) of second crystal phase (second rare earth aluminate): $P2_d$ Mass ratio (% by mass) of third crystal phase (aluminum oxide particles): $P3_m$ True density (g/cm$^3$) of third crystal phase (aluminum oxide particles): $P3_d$ $P1_m + P2_m + P3_m = 100\%$ by mass wherein the content (% by mass) of the second crystal phase in the ceramic complex can be calculated based on the above formulae (3) and (4).

As for the sintered body, the first sintered body, and the second sintered body obtained by the method for producing a ceramic complex, the relative density, the apparent density, and the true density can be respectively calculated by replacing the ceramic complex in the formulae (5) to (7) with the sintered body, the first sintered body, or the second sintered body.

The first rare earth aluminate fluorescent material contained in the first crystal phase of the ceramic complex preferably has a first rare earth aluminate composition that contains at least one first rare earth element $Ln^1$ selected from the group consisting of Y, Lu, Gd, and Tb, Ce serving as the activating element, Al, and O (oxygen), and may optionally contain Ga, in which the total molar ratio of the first rare earth element $Ln^1$ and Ce is 3; the molar ratio of Ce is the product of a parameter a in a range of more than 0 and 0.22 or less, and 3; the total molar ratio of Al and Ga is in a range of 4.5 or more and 5.5 or less; the molar ratio of Al is the product of a parameter c in a range of more than 0 and 1.1 or less, and 5; and the molar ratio of Ga that may be optionally contained is the product of a parameter b in a range of 0 or more and 0.4 or less, and 5. The composition of the first rare earth aluminate fluorescent material is preferably the same as that of the first rare earth aluminate fluorescent material contained in the raw material mixture. By containing the first rare earth aluminate fluorescent material in the first crystal phase of the ceramic complex, the light emitted from the excitation light source is wavelength-converted and can be emitted from the ceramic complex. The first rare earth aluminate fluorescent material contained in the first crystal phase of the ceramic complex preferably has a composition represented by the above formula (I).

The second rare earth aluminate constituting the second crystal phase of the ceramic complex may contain at least one second rare earth element selected from the group consisting of Y, La, Pr, Nd, Pm, Sm, Eu, Gd, Tb, Dy, Ho, Er, Tm, Yb, and Lu. The second rare earth aluminate preferably contains at least one second rare earth element $Ln^2$ selected from the group consisting of Y, Gd, Tb, and Lu. The second rare earth aluminate preferably has a second rare earth aluminate composition that contains at least one second rare earth element $Ln^2$ selected from the group consisting of Y, Gd, Tb, and Lu, and Al, in which the molar ratio of the second rare earth element $Ln^2$ is 3 and the molar ratio of Al is 5. This is because the second rare earth aluminate having the composition can be easily integrated with the first rare earth aluminate fluorescent material, and the first crystal diameter of the first crystal phase can be increased. The second rare earth aluminate constituting the second crystal phase contained in the ceramic complex preferably has a composition represented by the above formula (II) since it is easily integrated with the first rare earth aluminate fluorescent material. The second crystal phase composed of the second rare earth aluminate substantially does not contain an element that can be an activator; and the content of an element that can be an activator in the second crystal phase is 200 ppm by mass or less, and may be 150 ppm by mass or less, may be 100 ppm by mass or less, may be the above-mentioned measurement limit by EDX or less, may be at 0 ppm by mass, may be 0.1 ppm by mass or more, or may be 1 ppm by mass or more. When the activating element of the first rare earth aluminate fluorescent material is cerium (Ce), the content of cerium (Ce) in the second crystal phase composed of the second rare earth aluminate is 200 ppm by mass or less.

Light Emitting Device

The ceramic complex can be used as a member constituting a wavelength conversion member of a light emitting device in combination with a light source. An example of a light emitting device using the ceramic complex will be described.

The light emitting device comprises a wavelength conversion member including a ceramic complex, and an excitation light source.

Figure 3A:
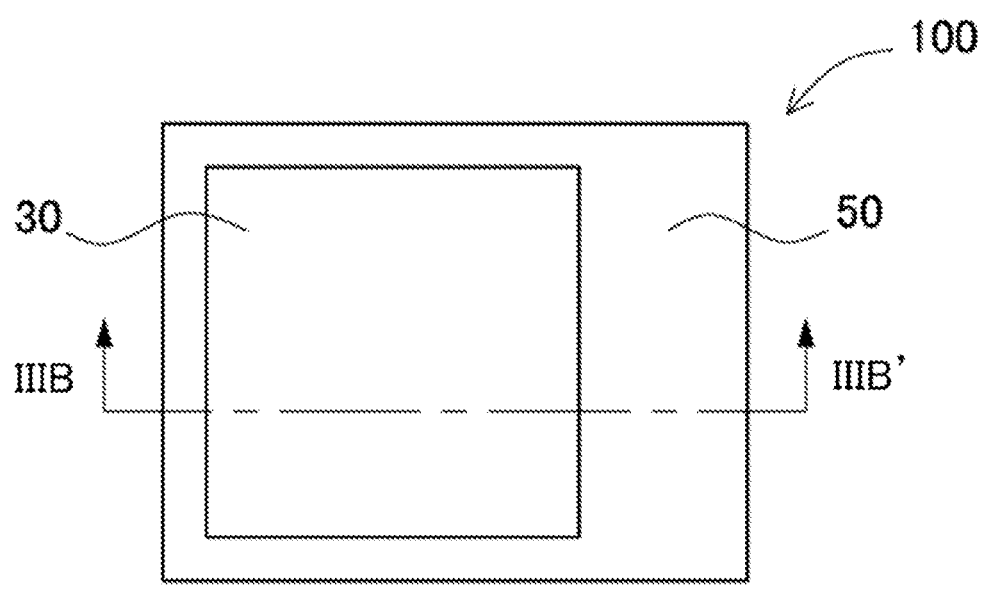
FIG. 3A is a schematic plan view of a light emitting device according to the present disclosure.
Figure 3B:
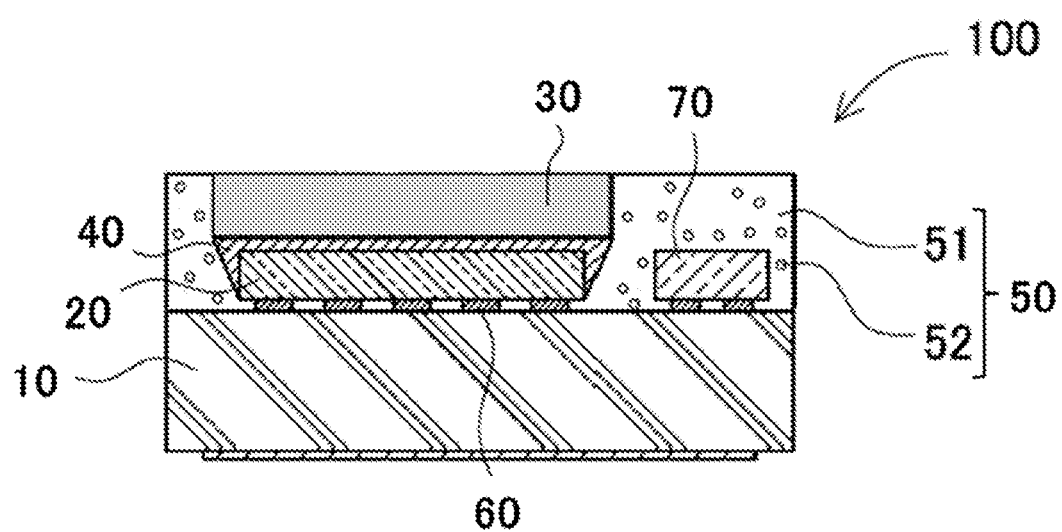
FIG. 3B is a schematic cross-sectional view of a light emitting device according to the present disclosure.

FIG. 3A shows an exemplary light emitting device and is a schematic plan view of a light emitting device 100; and FIG. 3B is a schematic cross-sectional view of the IIIB-IIIB' line of the light emitting device 100 shown in FIG. 3A. The light emitting device 100 includes a light emitting element 20 composed of an LED or LD, and a wavelength conversion member 30 composed of a ceramic complex that is excited by light emitted from the light emitting element 20 to emit light. The light emitting element 20 is flip-chip mounted on a substrate 10 via bumps which are conductive members 60. The wavelength conversion member 30 is arranged on the light emitting surface of the light emitting element 20 via an adhesive layer 40. The side surfaces of the light emitting element 20 and the wavelength conversion member 30 are covered with a covering member 50 that reflects light. The light emitting element 20 receives electric power from the outside of the light emitting device 100 via wiring and the conductive members 60 formed on the substrate 10, so that the light emitting device 100 is able to emit light. The light emitting device 100 may include a semiconductor element 70 such as a protective element for preventing the light emitting element 20 from being destroyed by applying an excessive voltage. The covering member 50 is provided so as to cover, for example, the semiconductor element 70. The covering member 50 may include a resin 51 and at least one additive material 52 selected from the group consisting of a colorant, a fluorescent material, and a filler. Each member used in the light emitting device will be hereunder described. For the details, for example, the disclosure of Japanese Unexamined Patent Publication No. 2014-112635 may be referred to.

Light Emitting Element

As the light emitting element, for example, an LED chip or LD chip, which is a semiconductor light emitting element using a nitride-based semiconductor, can be used The light emitting element preferably has a light emission peak wavelength in a range of 380 nm or more and 500 nm or less, more preferably in a range of 390 nm or more and 495 nm or less, even more preferably in a range of 400 nm or more and 490 nm or less, and particularly preferably in a range of 420 nm or more and 490 nm or less. The light emitting element is provided with a p-electrode and an n-electrode. The p-electrode and the n-electrode of the light emitting element may be formed on the same side surface as the light emitting element, or may be provided on different side surfaces. The light emitting element may be flip-chip mounted.

Wavelength Conversion Member

As the wavelength conversion member, the above-mentioned ceramic complex can be used. The thickness of the ceramic complex used as the wavelength conversion member may be in a range of 50 μm or more and 500 μm or less, may be in a range of 60 μm or more and 450 μm or less, or may be in a range of 70 μm or more and 400 μm or less. The size of the ceramic complex used as the wavelength conversion member may be a size capable of covering the entire light-extracting surface of the light emitting element. There may be an adhesive layer interposed between the light emitting element and the wavelength conversion member, and the light emitting element and the wavelength conversion member may be adhered by the adhesive layer. The adhesive constituting the adhesive layer is preferably made of a material capable of optically connecting the light emitting element and the wavelength conversion member. The material constituting the adhesive layer is preferably at least one resin selected from the group consisting of an epoxy resin, a silicone resin, a phenol resin, and a polyimide resin.

Substrate

The substrate is preferably made of an insulating material that is hard to transmit light from the light emitting element and external light. Examples of the material of the substrate include ceramics such as aluminum oxide and aluminum nitride, and resins such as a phenol resin, an epoxy resin, a polyimide resin, a bismaleimide triazine resin (BT resin), and a polyphthalamide (PPA) resin. Ceramics have high heat resistance and are thus preferable as a substrate material.

Adhesive Layer

The adhesive layer is interposed between the light emitting element and the wavelength conversion member to adhere the light emitting element and the wavelength conversion member together. The adhesive constituting the adhesive layer is preferably made of a material capable of optically connecting the light emitting element and the wavelength conversion member. The material constituting the adhesive layer is preferably at least one resin selected from the group consisting of an epoxy resin, a silicone resin, a phenol resin, and a polyimide resin.

Semiconductor Element

Examples of the semiconductor element optionally provided in the light emitting device include a transistor for controlling the light emitting element and a protective element for suppressing the destruction and the performance deterioration of the light emitting element due to excessive voltage application. Examples of the protective element include a Zener diode and a capacitor.

Covering Member

As the material of the covering member, an insulating material is preferably used. More specific examples thereof include a phenol resin, an epoxy resin, a bismaleimide triazine resin (BT resin), a polyphthalamide (PPA) resin, and a silicone resin. The covering member may optionally include at least one additive material selected from the group consisting of a colorant, a fluorescent material, and a filler.

Conductive Member

As the conductive member, a bump can be used. Examples of the material of the bump include Au and an alloy thereof, and examples of the other conductive member include eutectic solder (Au—Sn), Pb—Sn, and lead-free solder.

Method for Producing Light Emitting Device

An example of the method for producing a light emitting device will be described. For the details, for example, the disclosure of Japanese Unexamined Patent Publication No. 2014-112635 or Japanese Unexamined Patent Publication No. 2017-117912 may be referred to. The method for producing a light emitting device preferably includes a step of arranging a light emitting element, optionally a step of arranging a semiconductor element, a step of forming a wavelength conversion member including a ceramic complex, a step of adhering a light emitting element and a wavelength conversion member, and a step of forming a covering member.

Step of Arranging Light Emitting Element

In the step of arranging a light emitting element, the light emitting element is arranged and mounted on the substrate. For example, the light emitting element and the semiconductor element are flip-chip mounted on the substrate.

Step of Adhering Light Emitting Element and Wavelength Conversion Member

In the step of adhering a light emitting element and a wavelength conversion member, the wavelength conversion member is opposed to the light emitting surface of the light emitting element, and the wavelength conversion member is adhered onto the light emitting element by the adhesive layer.

Step of Forming Covering Member

In the step of forming a covering member, the side surfaces of the light emitting element and the wavelength conversion member excluding the light emitting surface are covered with the composition for a covering member, and the covering member is formed on the side surfaces of the light emitting element and the wavelength conversion member excluding the light emitting surface. The covering member is for reflecting light emitted from the light emitting element, and is formed so as to cover the side surfaces without covering the light emitting surface of the wavelength conversion member and to embed the semiconductor element.

As described above, the light emitting device shown in FIGS. 3A and 3B can be produced.

EXAMPLES

The present disclosure is hereunder specifically described by reference to the following Examples. The present disclosure is not limited to these Examples.

Example 1

Step of Preparing Raw Material Mixture

A first rare earth aluminate fluorescent material having a composition of $(Y_{0.893}Gd_{0.10}Ce_{0.007})_3Al_5O_{12}$ containing Ce as the activating element, and Y and Gd as the first rare earth elements was prepared. The first average particle diameter D1 of the first rare earth aluminate fluorescent material particles according to the FSSS method was 10 μm.

Yttrium oxide ($Y_2O_3$) containing Y as the second rare earth element was prepared. The second average particle diameter D2 of the yttrium oxide particles, which were the oxide particles containing the second rare earth element, according to the FSSS method was 0.1 μm.

As the aluminum oxide particles, aluminum oxide ($Al_2O_3$) having a purity of aluminum oxide of 99% by mass was prepared. The third average particle diameter D3 of the aluminum oxide particles according to the FSSS method was 0.6 μm.

Next, 14 g of the first rare earth aluminate fluorescent material, 0.5 g of the yttrium oxide particles, and 85.5 g of the aluminum oxide particles were respectively weighed and mixed using a dry-type ball mill, and balls as mixing media were removed, thereby preparing a raw material mixture. The content of each of the particles relative to 100% by mass of the raw material mixture composed of the total of the first rare earth aluminate fluorescent material particles, the yttrium oxide particles, and the aluminum oxide particles, is shown in Table 1.

Step of Preparing Molded Body

The raw material mixture was charged in a die to form a cylindrical molded body having a diameter of 65 mm and a thickness of 15 mm at a pressure of 5 MPa (51 kgf/cm²). The obtained cylindrical molded body was placed in a packaging container and vacuum-packed, and subjected to cold isostatic pressing (CIP) at 176 MPa using a CIP apparatus (manufactured by Kobe Steel, Ltd. (KOBELCO)) to obtain a molded body.

Step of Obtaining Sintered Body

Primary Calcining Step

The obtained molded body was primarily calcined at a temperature of 1,650° C. in an air atmosphere (0.101 MPa, oxygen concentration of 20% by volume) using a calcining furnace (manufactured by Marusho Denki Co., Ltd.) to obtain a first sintered body.

Secondary Calcining Step

The obtained first sintered body was secondarily calcined by hot isostatic pressing (HIP) at a temperature of 1,650° C. and a pressure of 195 MPa for 2 hours under a nitrogen gas atmosphere (99.99% by volume or more) using nitrogen gas as a pressure medium, by using a HIP apparatus (manufactured by Kobe Steel, Ltd. (KOBELCO)) to obtain a second sintered body. The second sintered body was cut into a predetermined shape and size using a wire saw, and the surface of the cut section was polished using a surface grinder, thereby obtaining a plate-shaped ceramic complex of Example 1 having a thickness of 180 μm. In the ceramic complex of Example 1, along with the particle growth of the aluminum oxide particles, the second crystal phase composed of the second rare earth aluminate represented by $Y_3Al_5O_{12}$, which was formed by reacting the aluminum oxide particles with the yttrium oxide particles, was formed. The content of Ce in the second crystal phase of the cross section of the ceramic complex was measured using a wavelength dispersion-type X-ray analysis EPMA (WDS) apparatus (JXA-8230, manufactured by JEOL Ltd.). As a result, the content of Ce was 100 ppm by mass or less.

Examples 2 to 5

A ceramic complex in each of Examples 2 to 5 was obtained in the same manner as in Example 1 except that the contents of the yttrium oxide particles and the aluminum oxide particles contained in the raw material mixture were changed as shown in Table 1.

Example 6

A first rare earth aluminate fluorescent material having a composition of $(Y_{0.940}Gd_{0.05}Ce_{0.010})_3Al_5O_{12}$ containing Ce as the activating element, and Y and Gd as the first rare earth elements was prepared. The first average particle diameter D1 of the first rare earth aluminate fluorescent material particles according to the FSSS method was 15 μm. Using the above first rare earth aluminate fluorescent material and the same yttrium oxide particles and aluminum oxide particles as in Example 1, 10.5 g of the first rare earth aluminate fluorescent material, 10 g of the yttrium oxide particles, and 9.57 g of the aluminum oxide particles were respectively weighed, and a raw material mixture was prepared in the same manner as in Example 1. The content of each of the particles relative to 100% by mass of the raw material mixture composed of the total of the first rare earth aluminate fluorescent material particles, the yttrium oxide particles, and the aluminum oxide particles, is shown in Table 1. A ceramic complex of Example 6 was obtained in the same manner as in Example 1 except that the above raw material mixture was used. In the ceramic complex of Example 6, along with the particle growth of the aluminum oxide particles, the second crystal phase composed of the second rare earth aluminate represented by $Y_3Al_5O_{12}$, which was formed by reacting the aluminum oxide particles with the yttrium oxide particles, was formed. The content of Ce in the second crystal phase of the cross section of the ceramic complex was measured using the above-mentioned wavelength dispersion-type X-ray analysis EPMA (WDS) apparatus. As a result, the content of Ce was 100 ppm by mass or less.

Comparative Example 1

A ceramic complex of Comparative Example 1 was obtained in the same manner as in Example 1 except that a raw material mixture containing 86 g of the aluminum oxide particles and no yttrium oxide particles was used.

Comparative Example 2

A ceramic complex of Comparative Example 2 was obtained in the same manner as in Example 6 except that a raw material mixture containing 89.5 g of the aluminum oxide particles and no yttrium oxide particles was used.
Particle Diameter Measurement The average particle diameter of each of the first rare earth aluminate fluorescent material particles, the oxide particles, and the aluminum oxide particles was measured as follows.

As for each of the particles, using a Fisher Sub-Sieve Sizer Model 95 (manufactured by Fisher Scientific Inc.) under an environment of a temperature of 25° C. and a relative humidity of 70%, 1 cm³ of the particles (raw material sample) was weighed and packed in a dedicated tubular container, followed by flowing dry air at a constant pressure, and the specific surface area was read from the differential pressure to calculate the average particle diameter according to the FSSS method. The results are as described above.

Using the obtained ceramic complex in each of Examples and Comparative Examples, the light emitting device 100 shown in FIGS. 3A and 3B was produced as follows. The light emitting element 20 and the semiconductor element 70 were mounted on the mounting substrate 10. Specifically, the light emitting element 20 having a thickness of about 0.11 mm, a substantially square planar shape of about 1.0 mm square, and a dominant wavelength of 450 nm, which was formed by laminating a nitride semiconductor on a sapphire substrate, and the semiconductor element 70 were arranged in line such that the side of the sapphire substrate serving as a semiconductor growth substrate faced the light emitting surface; and these were flip-chip mounted on the conductive pattern formed on the mounting substrate 10 by using the conductive members 60 composed of Au.

Next, a silicone resin serving as the adhesive layer 40 was arranged on the upper surface of the light emitting element 20, and the wavelength conversion member 30 obtained by forming the ceramic complex in each of Examples and Comparative Examples into a plate shape was adhered to the upper surface of the sapphire substrate of the light emitting element 20.

Next, the covering member 50 was arranged around the light emitting element 20, the wavelength conversion member 30, and the semiconductor element 70. The covering member 50 was arranged along the side surfaces of the light emitting element 20 and the wavelength conversion member 30, and the semiconductor element 70 was completely embedded in the covering member 50. A dimethyl silicone resin was used as the resin 51 contained in the covering member 50, and titanium oxide particles having an average particle diameter of 0.28 μm serving as the light-reflecting material 52 was contained in the covering member 50 in an amount of 60% by mass relative to the resin 51. Through such steps, the light emitting device 100 shown in FIGS. 3A and 3B was produced.

The light emitting device using the ceramic complex in each of Examples and Comparative Examples was evaluated as follows. The results are shown in Table 1.
Relative Luminance and Chromaticity Coordinates (x, y)

Figure 4:
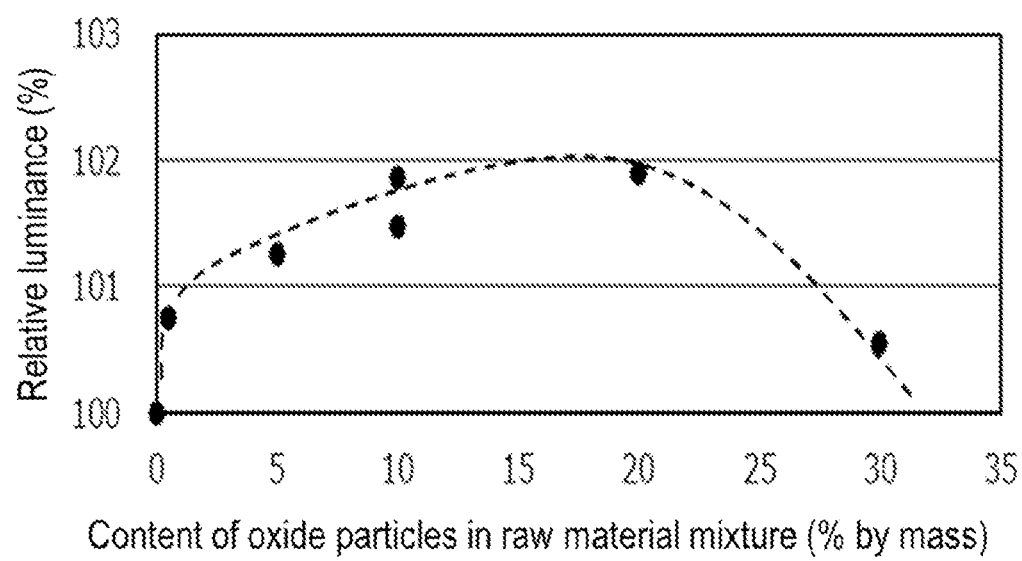
FIG. 4 is a graph describing a relationship between the content (% by mass) of oxide particles contained in a raw material mixture and the relative luminance of a ceramic complex according to the present disclosure.
Figure 5:
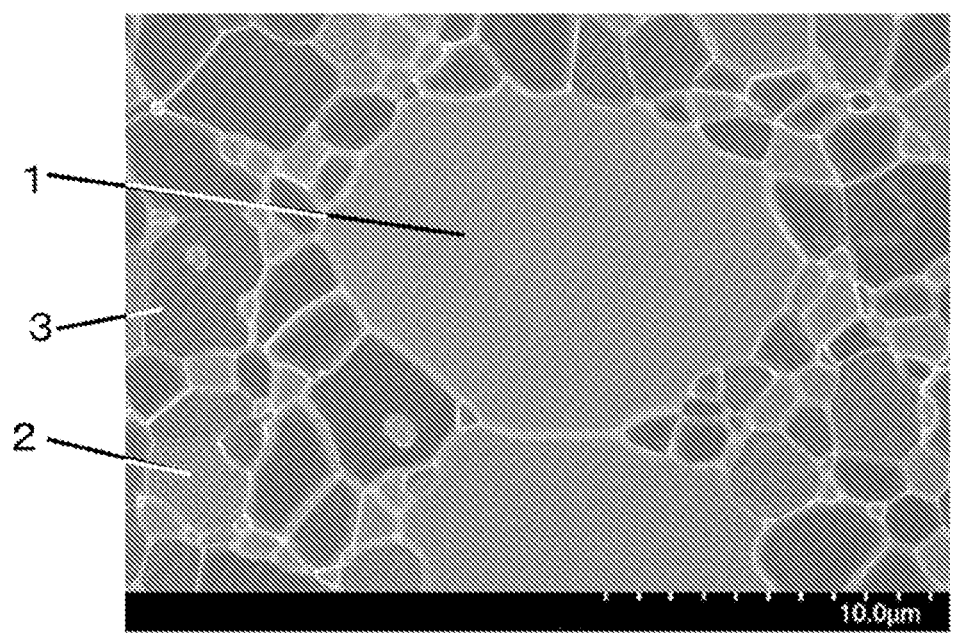
FIG. 5 is a scanning electron microscope (SEM) photograph of a secondary electron image in a cross section of a ceramic complex according to Example 3.

For the ceramic complex in each of Examples and Comparative Examples, the luminance and the chromaticity coordinates (x, y) in the chromaticity coordinate system of the Commission Internationale de l'Eclairage (CIE) 1931 chromaticity diagram were determined using an imaging color luminance meter (ProMetric I8, manufactured by Radiant Vision Systems, LLC). The relative luminance was determined from the relative value of the luminance of the ceramic complex in each of Examples and Comparative Examples when the luminance of the ceramic complex of Comparative Example 1 was defined as 100%. FIG. 4 is a graph describing a relationship between the content of the yttrium oxide particles in the raw material mixture used in each ceramic complex and the relative luminance of each ceramic complex obtained from the raw material mixture.
Contents of First Crystal Phase and Second Crystal Phase The content of the first crystal phase (% by volume) and the content of the second crystal phase (% by volume and % by mass) were determined based on the above formulae (1) to (4).
Relative Density The relative density of the ceramic complex in each of Examples and Comparative Examples was determined based on the above formulae (5) to (7). In the formula (7), the true density of the ceramic complex was calculated as the true density of the first rare earth aluminate fluorescent material $((Y_{0.940}Gd_{0.05}Ce_{0.010})_3Al_5O_{12})$ was 4.73 g/cm³, the true density of the aluminum oxide ($Al_2O_3$) particles was 3.98 g/cm³, and the true density of the second rare earth aluminate ($Y_3Al_5O_{12}$) was 4.60 g/cm³.
SEM Image—Secondary Electron Image Using a scanning electron microscope (SEM) (SU3500, manufactured by Hitachi High-Technologies Corp.), an SEM photograph of a secondary electron image in the cross section (polished surface) of the ceramic complex in each of Examples and Comparative Examples was obtained. FIG. 5 shows an SEM photograph of the secondary electron image in the cross section (polished surface) of the ceramic complex in Example 3.
Crystal Diameter The first crystal diameter G1 of the first crystal phase containing the first rare earth aluminate fluorescent material, the second crystal diameter G2 of the second crystal phase composed of the second rare earth aluminate, and the ratio G2/G1 were measured from the SEM photograph of the polished cross sectional surface of the ceramic complex in each of Examples and Comparative Examples under the following measurement conditions.
Measurement Conditions:

in an SEM image of the cross section of the ceramic complex, the maximum width in the cross section of the first crystal phase or the second crystal phase, and the minimum width passing through the center point of the maximum width were measured; the average of the maximum width and the minimum width was defined as the diameter for each of the first crystal phase and the second crystal phase; and the average value of the diameters of 20 first crystal phases or second crystal phases randomly selected was regarded as the first crystal diameter G1 of the first crystal phase or the second crystal diameter G2 of the second crystal phase.

SEM Image—Reflected Electron Image

Figure 6:
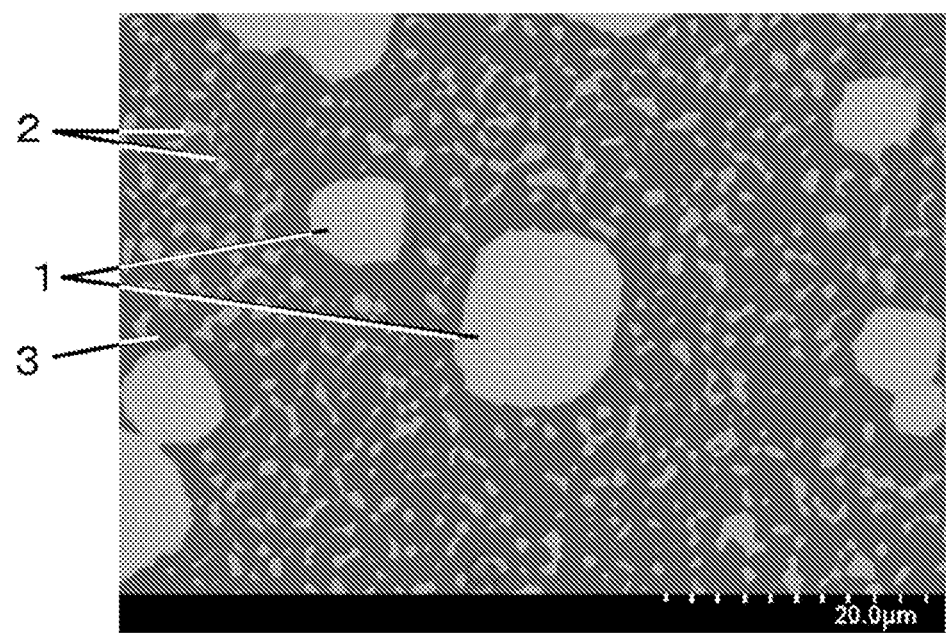
FIG. 6 is an SEM photograph of a reflected electron image in a cross section of the ceramic complex according to Example 3.

Using a field emission scanning electron microscope (FE-EM) (JSM-7800F, manufactured by JEOL Ltd.), an SEM photograph of a reflected electron image in the cross section (polished surface) of the ceramic complex in each of Examples and Comparative Examples was obtained. FIG. 6 shows an SEM photograph of the reflected electron image in the cross section (polished surface) of the ceramic complex in Example 3.

As shown in FIG. 4, when the content of the first rare earth aluminate fluorescent material particles was in the range of 5% by mass or more and 40% by mass or less, the content of the oxide particles was in the range of 0.1% by mass or more and 32% by mass or less, and the content of the aluminum oxide particles was the balance, relative to 100% by mass of the total amount of the first rare earth aluminate fluorescent material particles, the oxide particles, and the aluminum oxide particles in the raw material mixture, the relative luminance of the ceramic complex obtained from such a raw material mixture was higher than that of the ceramic complex having an oxide particle content outside

TABLE 1

| | Raw material mixture | | | Ceramic complex | | | | | | | | |
|---|---|---|---|---|---|---|---|---|---|---|---|---|
| | First rare earth aluminate fluorescent material particles | Oxide particles (% by mass) | Aluminum oxide particles (% by mass) | First crystal phase (% by volume) | Second crystal phase (% by mass) | Second crystal phase (% by volume) | First crystal diameter G1 (μm) | Second crystal diameter G2 (μm) | Particle diameter ratio G2/G1 | Relative density (%) | Chromaticity coordinates | | Relative luminance (%) |
| | (% by mass) | | | | | | | | | | x | y | |
| Example 1 | 14.0 | 0.5 | 85.5 | 12.0 | 0.9 | 0.8 | 10.1 | 1.2 | 0.1 | 99.9 | 0.315 | 0.322 | 100.8 |
| Example 2 | 14.0 | 5.0 | 81.0 | 12.0 | 8.8 | 7.7 | 10.3 | 1.0 | 0.1 | 99.8 | 0.316 | 0.324 | 101.3 |
| Example 3 | 14.0 | 10.0 | 76.0 | 12.0 | 17.5 | 15.5 | 10.6 | 1.1 | 0.1 | 99.7 | 0.324 | 0.340 | 101.5 |
| Example 4 | 14.0 | 20.0 | 66.0 | 12.0 | 35.1 | 31.8 | 11.0 | 2.1 | 0.2 | 99.4 | 0.330 | 0.352 | 101.9 |
| Example 5 | 14.0 | 30.0 | 56.0 | 12.0 | 52.6 | 49.0 | 10.8 | 2.8 | 0.3 | 99.2 | 0.326 | 0.344 | 100.6 |
| Example 6 | 10.5 | 10.0 | 79.5 | 9.0 | 17.5 | 15.5 | 14.6 | 1.1 | 0.1 | 99.9 | 0.322 | 0.336 | 101.9 |
| Comparative Example 1 | 14.0 | 0.0 | 86.0 | 12.0 | 0.0 | 0.0 | 10.5 | — | — | 99.9 | 0.315 | 0.320 | 100.0 |
| Comparative Example 2 | 10.5 | 0.0 | 89.5 | 9.0 | 0.0 | 0.0 | 15.2 | — | — | 100.0 | 0.313 | 0.316 | 100.0 |

The ceramic complex according to each of Examples 1 to 6 had higher relative luminance than that of the ceramic complex according each of Comparative Examples 1 and 2. It is presumed that the first crystal diameter G1 of the first crystal phase containing the first rare earth aluminate fluorescent material in the ceramic complex according to each of Examples 1 to 6 was larger than the first crystal diameter G1 of the first crystal phase composed of the first rare earth aluminate fluorescent material in the ceramic complex according to each of Comparative Examples 1 and 2, and thus a part of the second rare earth aluminate formed by reacting the oxide particles with the aluminum oxide was integrated with the first rare earth aluminate fluorescent material to form the first crystal phase containing the first rare earth aluminate fluorescent material. It is presumed that the ceramic complex according to each of Examples 1 to 6 had a larger first crystal diameter G1 of the first crystal phase, and thus the light emitted from the excitation light source was easily wavelength-converted and the relative luminance was enhanced. In addition, the ceramic complex according to each of Examples 1 to 6 contained the second crystal phase composed of the second rare earth aluminate by reacting the oxide particles with the aluminum oxide particles, so that the light could be scattered at the interface between the second crystal phase and the third crystal phase composed of the aluminum oxide particles and emitted to the outside of the ceramic complex, and the absorption of light in the first crystal phase containing the first rare earth aluminate fluorescent material could be enhanced to increase the wavelength conversion efficiency of light, resulting that the relative luminance was higher than that of the ceramic complex according to each of Comparative Examples 1 and 2.

the above range. In particular, the ceramic complex according to each of Examples 1 to 4, which were obtained from the raw material mixture with the content of the oxide particles in a range of 3.0% by mass or more and 25% by mass or less, had a higher relative luminance than that of the ceramic complex according to each of Comparative Examples 1 and 2 by 1% or more.

As shown in the secondary electron image of the ceramic complex according to Example 3 shown in FIG. 5 and the reflected electron image of the ceramic complex according to Example 3 shown in FIG. 6, the first crystal phase 1 containing the first rare earth aluminate fluorescent material, the second crystal phase 2 composed of the second rare earth aluminate, and the third crystal phase 3 composed of the aluminum oxide particles were observed in the ceramic complex. A clear interface was observed between the second crystal phase 2 and the third crystal phase 3. It is presumed that, since the first crystal diameter G1 of the first crystal phase 1 of the ceramic complex according to each of Examples 1 to 6 was larger than that of the first crystal phase 1 of the ceramic complex according to each of Comparative Examples 1 and 2, the first rare earth aluminate fluorescent material was integrated with the second rare earth aluminate formed by reacting the oxide particles with the aluminum oxide. In the first crystal phase 1, no interface was observed between the first rare earth aluminate fluorescent material and the second rare earth aluminate, and it was observed that they were integrated.

The ceramic complex obtained by the method for producing a ceramic complex according to the embodiment of the present disclosure can be used as a wavelength conversion member for various applications such as an on-vehicle light source, an illumination device for general lighting, a backlight of a liquid crystal display device, and a light source for a projector, in combination with an excitation light source such as an LED or LD.

The invention claimed is:

1. A ceramic complex, comprising
   a first crystal phase that contains a first rare earth aluminate fluorescent material containing an activating element and a first rare earth element different from the activating element,
   a second crystal phase comprising a second rare earth aluminate containing a second rare earth element, wherein a content of an element capable of being an activator in the second crystal phase is 200 ppm by mass or less, and
   a third crystal phase comprising aluminum oxide,
   wherein a content of the first crystal phase is in a range of 5% by volume or more and 45% by volume or less, a content of the second crystal phase is in a range of 0.5% by volume or more and 50% by volume or less, and a content of the third crystal phase is the balance, relative to 100% by volume of a total amount of the first crystal phase, the second crystal phase, and the third crystal phase, and
   wherein a first crystal diameter G1 of the first crystal phase is in a range of 5 μm or more and 40 μm or less, and a second crystal diameter G2 of the second crystal phase is in a range of 0.5 μm or more and less than 5 μm, as measured under the following measurement conditions:
   in a scanning electron microscope (SEM) image obtained by photographing a cross section of the ceramic complex using an SEM, the maximum width in the cross section of the first crystal phase or the second crystal phase, and the minimum width passing through a center point of the maximum width are measured; an average of the maximum width and the minimum width is defined as a diameter for each of the first crystal phase and the second crystal phase; and an average value of the diameters of 20 first crystal phases or second crystal phases randomly selected is regarded as the first crystal diameter G1 of the first crystal phase or the second crystal diameter G2 of the second crystal phase.

2. The ceramic complex according to claim 1, wherein a ratio G2/G1 of the second crystal diameter G2 to the first crystal diameter G1 is 0.4 or less.

3. The ceramic complex according to claim 1, having a relative density that is 95% or more.

4. The ceramic complex according to claim 1, wherein the first rare earth aluminate fluorescent material has a first rare earth aluminate composition that contains at least one first rare earth element $Ln^1$ selected from the group consisting of Y, Lu, Gd, and Tb, Ce serving as the activating element, Al, and O (oxygen), and optionally contains Ga, wherein the total molar ratio of the first rare earth element $Ln^1$ and Ce is 3; the molar ratio of Ce is the product of 3 and a parameter a, where the parameter a is in a range of more than 0 and 0.22 or less; the total molar ratio of Al and Ga is in a range of 4.5 or more and 5.5 or less; the molar ratio of Al is the product of 5 and a parameter c, where the parameter c is in a range of more than 0 and 1.1 or less; and the molar ratio of Ga is the product of 5 and a parameter b, where the parameter b is in a range of 0 or more and 0.4 or less.

5. The ceramic complex according to claim 1, wherein the first rare earth aluminate fluorescent material has a composition represented by the following formula (I):

$$(Ln^1_{1-a}Ce_a)_3(Al_cGa_b)_5O_{12} \qquad (I)$$

wherein $Ln^1$ represents at least one element selected from the group consisting of Y, Gd, Lu, and Tb; and the parameters a, b, and c each satisfy $0<a\leq0.22$, $0\leq b\leq0.4$, $0<c\leq1.1$, and $0.9\leq b+c\leq1.1$.

6. The ceramic complex according to claim 1, wherein the second rare earth aluminate has a second rare earth aluminate composition that contains at least one second rare earth element $Ln^2$ selected from the group consisting of Y, Gd, Tb, and Lu, and Al, wherein a molar ratio of the second rare earth element $Ln^2$ is 3 and a molar ratio of Al is 5.

7. The ceramic complex according to claim 1, wherein the second rare earth aluminate has a composition represented by the following formula (II):

$$Ln^2_3Al_5O_{12} \qquad (II)$$

wherein $Ln^2$ represents at least one selected from the group consisting of Y, Gd, Tb, and Lu.

* * * * *